United States Patent [19]

Hoguet et al.

[11] 4,435,181

[45] Mar. 6, 1984

[54] CONCENTRATED FLOWABLE STORAGE STABLE AQUEOUS FORMULATIONS OF COLD DYEING FIBER REACTIVE DYESTUFFS

[75] Inventors: Robert G. Hoguet; Dietmar Kalz; Thomas J. Thomas; Henry T. Whetsell, all of Summerville, S.C.; Joachim Wolff, Cologne, Fed. Rep. of Germany; Konrad Nonn; Karl-Heinz Wolf, both of Leverkusen, Fed. Rep. of Germany

[73] Assignees: Mobay Chemical Corporation, Pittsburgh, Pa.; Bayer Aktiengesellschaft, Bayerwerk, Fed. Rep. of Germany

[21] Appl. No.: 370,426

[22] Filed: Apr. 21, 1982

[51] Int. Cl.$^3$ ............................................. D06P 67/00
[52] U.S. Cl. ........................................ 8/527; 8/549; 8/553; 8/589; 8/918
[58] Field of Search ................... 8/549, 527, 553, 589

[56] References Cited

U.S. PATENT DOCUMENTS

| | | | |
|---|---|---|---|
| 3,770,371 | 11/1973 | Bossard et al. | 8/89 |
| 4,071,312 | 1/1978 | Blackwell | 8/7 |
| 4,072,463 | 2/1978 | Schlafer et al. | 8/527 |
| 4,110,073 | 8/1978 | Mollet et al. | 8/85 R |
| 4,264,323 | 4/1981 | Capponi et al. | 8/527 |
| 4,283,195 | 8/1981 | Nakatsuka et al. | 8/524 |
| 4,349,349 | 9/1982 | Nakatsuka et al. | 8/527 |

FOREIGN PATENT DOCUMENTS 2843015  4/1980  Fed. Rep. of Germany.

*Primary Examiner*—A. Lionel Clingman
*Attorney, Agent, or Firm*—Gene Harsh; Lawrence S. Pope

[57] ABSTRACT

The present disclosure is concerned with storage stable concentrated fluid aqueous dispersions of water soluble cold dyeing fiber reactive dyes. These dispersions contain anionic or polyvinyl dispersants to provide resistance against settling or agglomeration and water soluble electrolytes to provide resistance against hydrolysis of the fiber reactive groups. The dispersions have an average particle size of less than 100 microns and in a preferred embodiment sufficient buffering agent to stabilize the pH at between about 5 and 8.

14 Claims, No Drawings

CONCENTRATED FLOWABLE STORAGE STABLE AQUEOUS FORMULATIONS OF COLD DYEING FIBER REACTIVE DYESTUFFS

FIELD OF THE INVENTION

The present invention relates to concentrated flowable formulations of fiber reactive dyestuffs which are both storage stable and readily soluble in aqueous dye baths. These formulations are based upon those reactive dyestuffs which fix to textile substrates with minimal heat input and are accordingly known as "cold dyers."

BACKGROUND OF THE INVENTION

Traditionally, dyestuffs have been available as dry powders which have numerous inherent disadvantages. Such powders are dusty, resulting in health hazards due to worker inhalation of the dust and leading to cross contamination of one dyestuff by dust from another. Additionally, these powders require considerable energy and effort to dissolve them into the aqueous dye baths typically used in the textile dyeing industry. Furthermore, this powder form cannot be readily adapted for automated metering and handling making their utilization by the end user labor intensive and therefore inefficient compared to the potential offered by modern materials handling technology. Finally, the drying of dyestuffs from the wet filter cake form in which they are recovered from their synthesis batch is an energy intensive step. Therefore, the need to reduce dyestuffs to this dried, powder form significantly increases the cost of their production.

In response to these difficulties, a significant number of dyestuffs of various classes have been formulated in liquid form. Some types, such as those disclosed in U.S. Pat. No. 4,071,312 have simply been dissolved in water. However, some types of dyes either have insufficient solubility to permit the preparation of commercially significant concentrations or have a tendency to react with the water or solvents commonly used in dyestuffs formulations, if not immediately, during storage or shipment. Among the former type of dyes are the anionic dyes which are formulated into dispersions in U.S. Pat. No. 3,770,371 by the addition of sufficient salt to render these dyes substantially insoluble. A further development disclosed in U.S. Pat. No. 4,110,073 has been to utilize concentrations of anionic dyestuffs well above their normal solubility in water in combination with high levels of selected surfactants including lignin sulfonates.

Both the solution and dispersion techniques have been applied to some fiber reactive dyes, i.e. those dyes carrying groups capable of forming a covalent bond with the textile substrate, particularly cellulose, being dyed. The solution approach has generally been restricted to those dyes requiring fairly high temperatures (in excess of about 60° to 80° C.) to effect fixation to the textile substrate and such dyes are accordingly known as "hot dyers" and "warm dyers," respectively. The application of this solution approach to hot dyers and warm dyers in combination with careful pH control by buffers is disclosed in U.S. Pat. No. 4,072,463. The low room temperature reactivity of the fiber fixing groups of these dyes in combination with the careful pH control is evidently sufficient to avoid significant hydrolysis of these fiber reactive groups by the water solvent. The dispersion approach has been applied to both such "hot dyers" in U.S. Pat. Nos. 3,770,371 and 4,110,073 as well as to the "cold dyers" in U.S. Pat. No. 4,264,323.

These "cold dyers" are of particular interest because of their ability to fix on textile substrates at moderate temperatures by adjustment of the dye bath to alkaline conditions. However, their high reactivity with the hydroxyl groups of cellulose or other textile substrates which enables this low temperature dyeing also makes them highly susceptible to hydrolysis whenever exposed to water including the period of time before they are added to an aqueous dye bath for final utilization. In fact, the fiber reactive groups of these dyestuffs undergo significant hydrolysis when their initial synthesis is conducted in aqueous media.

U.S. Pat. No. 4,264,323 has proposed preparing dispersions of such "cold dyers" in saturated solutions of the very same dyestuffs. Although these formulations are evidently storable for relevantly long periods of time at "room temperature" nothing is reported about their stability under the range of thermal conditions actually experienced in the field. In particular, it is not possible to confidently conclude that such dispersions would resist both hydrolysis and settling or agglomeration upon exposure to the thermal cycling which would occur from the variation in day and night temperatures in a good part of the United States. Even though these formulations carefully exclude any dispersants or other additives which bear groups potentially reactive with their fiber fixing groups there remains the significant possibility of hydrolysis with their aqueous medium upon exposure to elevated temperatures during warehousing or transportation in the summer months.

German Patent Publication No. 2,843,015 has proposed formulations of such "cold dyers" in aqueous solutions of neutral or weak acid salts to give dispersions of the dyestuffs. There does not appear to be any discussion of possible hydrolysis with the water suspending medium but only a discussion at page 5, lines 25 to 29 that the disclosed procedure is advantageous because the primary and secondary alcohols typically used in formulating liquid dyes are reactive with the fiber fixing groups of these dyes. The dispersions are reported to settle within a few weeks but to be readily redispersible with stirring. It is also reported that the dispersions must be added to "hot" water or heated with steam to dissolve them in aqueous dye baths. These dispersions are also reported to be "stable" against heat and frost.

Therefore, there is a need for storage stable liquid concentrated dispersions of "cold dyeing" water soluble fiber reactive dyes. These dispersions need to display stability to both hydrolysis of their fiber reactive groups and settling or agglomeration of their dispersed dyestuff particles. They should also be readily flowable, preferably without substantial agitation. During storage under field conditions, these dispersions should not undergo a significant degradation of their dyeing potential by hydrolysis of their fiber reactive groups and therefore a loss of their ability to chemically bond with suitable textile substrates. Furthermore, they should be capable of storage for prolonged periods without experiencing any significant settling or agglomeration and at worst only, mild agitation should be required to render them fully fluid.

The field conditions actually experienced by commercially utilized dyestuffs include thermal cycling which can be a particularly severe test of the stability of such dispersions. Such dispersions may typically see a wide variation in temperature from day to night when being transported or warehoused. If the dispersed dyestuff dissolves to any significant degree at the elevated daytime temperatures on cooling to night temperatures, it may precipitate onto the dispersed dyestuff particles causing an increase in the average particle size (known as "Ostwald ripening"). A significant change in the average particle size may result in the dispersion settling or agglomerating.

This problem is of particular concern with regard to these "cold dyeing" fiber reactive dyes because of their normally high solubility in water. It is desirable that such dyestuffs readily dissolve with only mild agitation at mild temperatures when the dispersion is added to an aqueous dye bath and thus greatly diluted. This "kinetic solubility" is obtained both from the thermodynamic solubility of the dyestuff molecule and from a small dispersed particle size. Unfortunately, both factors favor "Ostwald ripening" of the dispersion.

Surprisingly, it has been found that aqueous dispersions of small particle size (under 100 microns) cold dyeing, water soluble, fiber reactive dyestuffs can be prepared in commercially attractive concentrations to have superior kinetic solubility in the ultimate dye bath and still display superior resistance to both hydrolysis of its fiber reactive group and settling or agglomeration of its particles by the judicious addition of an electrolyte, such as common salt, and a dispersant such as sodium ligninsulfonate.

SUMMARY OF THE INVENTION

The present invention involves concentrated flowable storage stable aqueous dispersions of water soluble cold dyeing fiber reactive dyestuffs having superior "kinetic solubility" in aqueous dye baths comprising.

(A) between about 10 and 50 wt. % of at least one dyestuff having an average particle size less than about 100 microns of the formula:

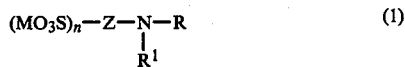 (1)

wherein
M = the cation of Li, Na, K, NH$_3$ or an organic amine
n = an integer of 1 to 5
Z = a dyestuff chromophore system
R$^1$ = H or Alkyl (C$_1$-C$_4$)
R = a fiber reactive group of one of the following structures:

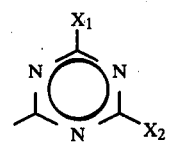

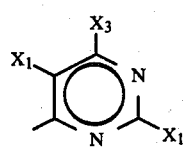

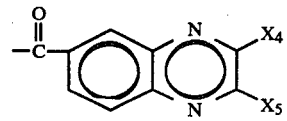

wherein
X$_1$ = Cl, F but F if X$_2$ not F or Cl
X$_2$ = Cl, F, NH$_2$, NHR$^2$, OR$^2$, SR$^2$, —CH$_2$R$^2$
X$_3$ = Cl, F, CH$_3$
X$_4$ = Cl, F
X$_5$ = Cl, F, CH$_3$ with the proviso that in formula (3) there is at least one F adjacent to one of the heterocyclic nitrogen atoms and wherein
R$^2$ = alkyl substituted by OH, SO$_3$H, COOH, or C$_1$-C$_4$-alkoxy,
aryl substituted by SO$_3$H, C$_1$-C$_4$-alkyl, or C$_1$-C$_4$-alkoxy,
aralkyl substituted by SO$_3$H, C$_1$-C$_4$-alkyl, or C$_1$-C$_4$-alkoxy;

(B) sufficient dispersant selected from the group consisting of anionic dispersing agents and vinyl polymers synthesized from monomers of the formula

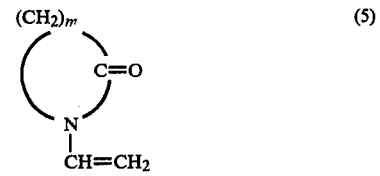 (5)

in which
m is an integer from 3 to 5;
to prevent significant agglomeration or settling of the dispersion under cycling from 20° to 50° C. for three weeks; and (C) sufficient water soluble electrolyte to prevent significant hydrolysis of the fiber reactive groups of the dispersed dyestuff under cycling from 20° to 50° C. for three weeks.

The dispersions may also contain buffering agents and other formulation additives.

DETAILED DESCRIPTION OF THE INVENTION

The aqueous dispersions of this invention preferably contain:
(a) 10-50 wt. %, more preferably 15-40 wt. % of dyestuff,
(b) 0.1-25 wt. %, more preferably 2-15 wt. %, most preferably 2-5 wt. % of dispersant,
(c) 1-30 wt. %, preferably 4-25 wt. % of electrolyte,
(d) 0.1-3 wt. %, preferably 0.2-1 wt. % of buffer, and
(e) 0-20 wt. %, preferably 0-10 wt. % of other additives.

For the preferred dyestuff of Formula (1), n stands for 1 to 4; Z stands for a dyestuff chromophore from the class of metal-free or metal-containing mono- or polyazo dyestuffs, metal-free or metal-containing Azaporphin dyestuffs, e.g., copper-, cobalt-, or nickelphthalocyanine dyestuffs; anthraquinone-, oxazine-, dioxazine-, triphenylmethane-, nitro-, azomethine-, or metal-free or metal-containing formazane dyestuffs.

Particularly preferred are azo-, anthraquinone-, and phthalocyanine dyestuffs. R preferably stands for one of the following substituents:

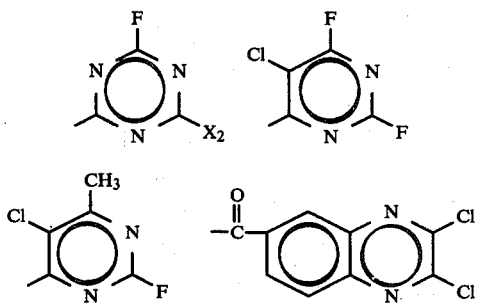

As anionic dispersion agents (Component B) the following products can be employed: alkylsulfonates; sulfated, unsaturated, fatty acids; sulfonates of polycarboxylic acid esters, alkylbenzenesulfonates, sulfated aliphatic alcohols, condensation products of ethylene oxide and amines, fatty acids, phenols or alcohols which are then reacted with polybasic inorganic acids, e.g., phosphoric acid or sulfuric acid to the corresponding esters. Preferred dispersants are the condensation products of aromatic sulfonic acids with formaldehyde or condensation products of ketones with bisulfite and formaldehyde. Especially preferred are lignin sulfonates or derivatives thereof, particularly sodium salts having low or no sugar content; molecular weights of between 5000 and 50,000; and between 0.5 and 5 sulphonic acid groups per 1,000 molecular weight units. Examples of anionic dispersing agents are specifically: sodium dodecylsulfonates, sodium laurylsulfates, sodium dodecylbenzene sulfonate, dibutylnaphthalenesulfonate, acidic sulfuric acid esters of the condensation products of 2 moles ethylene oxide with 1 mole nonylphenol, sodium dioctylsulfosuccinate, condensation products of cresol, $NaHSO_3$ and formaldehyde, condensation products of 2-hydroxynaphthalene-6-sulfonic acid with formaldehyde, sulfonic acids of condensation products of naphthalene, terphenyl or ditolylether with formaldehyde and condensation products of cyclohexanone with formaldehyde and $NaHSO_3$. All anionic surfactants are preferably used as their alkali and/or ammonium salts.

A significant number of these compounds and additional products, which may be considered as anionic surfactants, are described in K. Lindner, Tenside-Textilhilfsmittel-Waschrohstoffe, Volume 1 pages 571 to 835 (1964).

As vinyl polymers described by formula (4) (as Component B), polyvinyl pyrrolidones are preferably used and most especially polyvinyl pyrrolidone with a K-value between 15 and 100, preferably 15 and 50, as determined by relative viscosity measurement, are to be considered. [For determination of viscosity coefficient K: Modern Plastics, Vol. 23, Number 3, pages 157–161, 212, 214, 216, 218 (1945)].

As water-soluble electrolytes (Component C), the ammonium or alkali salts of inorganic mono- or polybasic acids, e.g., HCl, $H_2SO_4$, are preferably used. Alkali or ammonium salts of organic acids, e.g., acetic acid or oxalic acid, can also be used. The salts can either be added to the dyestuff dispersions or can already be contained in the dyestuffs from their manufacturing process. Examples of suitable salts are: LiCl $Li_2SO_4$, NaCl, $Na_2SO_4$, KCl, $K_2SO_4$, $NH_4Cl$, $(NH_4)_2SO_4$.

As buffering agents, compounds which cannot react with the reactive group of the dyestuff and which stabilize the pH value in a range of between about 5 and 8, can be employed; e.g., alkali-borate, -acetate, and -oxalate; the acidic alkali phosphates; alkaliphosphate, as well as mixtures of these. Preferred are mixtures of mono- and dibasic alkaliphosphates.

Further additives are, for example, preservatives, humectants, defoamers, and thickeners. Preservatives are products which inhibit, for example, formation of mold and/or bacterial growth. Suitable products are sodium pentachlorophenolate, condensation products of paraformaldehyde with aromatic alcohols, specifically benzylalcohol and/or solutions of formaldehyde. Preservatives are generally added in amounts of 0–3 wt. %, preferably in amounts of 0.05–0.5 wt. %.

As humectants, the usual substances which prevent drying-out are used in amounts of 0–20 wt. %, preferably 5–10 wt. %. Suitable humectants are, for example, formamides and glycolethers.

As thickeners, the following may be used: natural gums, such as guar gum, alginates, locust bean gum, gum arabic, ethylcellulose products, acrylates, methacrylates, or finely-dispersed silica gel, magnesium or aluminum silicates.

As defoamers, the usual dyestuff chemistry defoamers may be employed, e.g.: tributylphosphate, alkylsuccinic acid anhydride combined with aliphatic alcohols, methylpolysiloxane with $C_2$–$C_4$-alkoxy groups, in combination with finely-dispersed silica, as well as water-insoluble organic liquids, e.g., mineral oils, chlorinated mineral oils, liquid trifluorovinylchloride polymers mixed with hydrophobic, finely-dispersed silica, as described in Ullmanns Encyklopadie der techn. Chemie 4, Auflage, Volume 20.

Preparation of the dispersions of this invention is carried out as follows: the components are mixed together in water, and particle size is reduced, for example, with a high-speed agitator or one of the usual wet-grinding apparatus. Suitable wet-grinding apparatus are, for example, a rotor-stator mill, such as a carborundum-rotor-stator mill, dissolver, highpressure homogenizer, such as a Manton-Gaulin mill, or high-speed pearl mills with glass beads of 0.3 mm–2.0 mm diameter.

The dispersions of this invention generally have a particle size of between about 0.5 and 100 microns, preferably between about 1 and 50 microns, most preferably an average particle size of between 1 and 10 microns. A preferred way of preparing the dispersions is to charge components (B) and (C) into water, then add the dyestuff, and subsequently, wet-grind to obtain the appropriate particle size distribution.

In the present invention, the electrolyte addition renders the fiber reactive groups of the dispersed dye unreactive under normally encountered storage and shipment conditions. This is probably a result of the dyestuff having a negligible solubility in the aqueous solution of the electrolyte. Therefore, the dyestuff is inert to the other components of the dispersion and the choice of dispersants, solvents, buffers, and other additives is not restricted to substances free of hydroxy, amino or other functional groups traditionally recognized as reactive with the fiber fixing groups of these dyes.

The preparations of the present invention exhibit superior storage stability at elevated temperatures as well as ambient conditions. Addition of buffers, while not absolutely essential, further enhances this storage stability. Typical samples of these preparations exhibit unchanged shade and strength after cycling between 50° C. for 8 hours and 20° C. for 16 hours for three weeks (a simulation of day to night cycling expected in the summer in transport and unairconditioned warehousing) or at 25° C. for six months. This stability was verified both by dyeing applications and by chromatographic analysis. Similar preparations with low electrolyte content suffered serious deterioration due to hydrolysis after as little as one day at 50° C. or three weeks at 25° C.

These preparations have superior "kinetic solubility" which means they can be readily dissolved at mild temperature (as low as room temperature, about 20° C.) aqueous dye baths with no more than mild agitation. The water dilution which results from addition in typical levels to the dye bath normally results in the formation of true solutions of the dyestuff and in the achievement of dyeing properties equivalent to those obtained from any other type of preparation.

These preparations also have good fluidity and even if somewhat thixotropic are rendered free flowing with only mild agitation even after extended storage. Preferably, they have viscosities of less than about 5000 cps at 20° C., more preferably less than about 4000 cps and most preferably less than about 2000 cps.

These preparations are suitable for the usual end uses of fiber reactive dyestuffs including dyeing and printing of wool, natural or regenerated cellulose, or fiber mixtures containing one or more of the mentioned fibers.

In the following text, percent figures are exclusively wt. %.

EXAMPLES

EXAMPLE 1

A formulation based upon the following dyestuff:

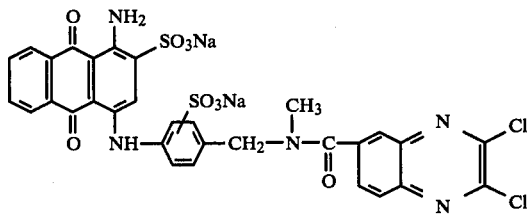

(I)

and having the following composition:
- 31.5% dyestuff (containing 8% of mixture of NaCl and $Na_2SO_4$),
- 3.0% dispersing agent based on ligninsulfonate (Lignosol® DXD from Reed Ltd. of Canada),
- 15.0% NaCl,
- 0.2% $KH_2PO_4$,
- 0.2% $K_2HPO_4$, and
- 50.0% water was prepared as follows:

500 g water, 150 g sodium chloride, 30 g of a lignosulfonate, and 2 g each of monopotassium and dipotassium phosphate are blended for 30 minutes in a 1500 ml beaker. 290 g of dyestuff (containing an additional 25 g of a salt mixture of sodium chloride and sodium sulfate) are charged into the solution and the resulting dispersion is well homogenized. With the aid of a rotor-stator mill, pressure homogenizer, or glass-ball or sand mill, the mixture is ground and dispersed until the average particle size is below 6 microns.

The viscosity of the dispersion was determined with a Brookfield Viscometer Model RVT at 20° C. and 20 rpm to be 200 cps.

The stability of this dispersion was tested by, cycling it at a temperature of 50° C. for eight hours and then 20° C. for 16 hours for a period of three weeks. No significant settling or thickening was observed. The dyeing strength was equivalent to that of the freshly prepared (approximately 1 week old) formulation.

Dyeings were made with freshly prepared and thermally cycled formulations by both the exhaust and pad-dry-thermosal-chemical pad-steam processes. In the former case, a liquor ratio of 1:20; additions of 10 g/l glauber salt and 10 g/l soda ash; and 90 minutes at about 40° C. were utilized. Sufficient dispersion was used to give a powder type equivalent of about 2 wt. % based on the weight of the cotton goods being dyed. In the latter case, the equivalent of 2 ounces of powder type equivalent per gallon was used to dye 100% cotton fabric and a mixed 65%/35% cotton polyester fabric. In all three cases the dyeings from the cycled formulation was equivalent to that from the freshly prepared formulation.

EXAMPLE II

A formulation based upon the following dyestuff:

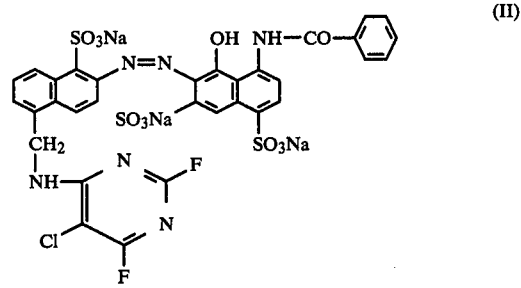

(II)

and having the following composition:
- 23.1% dyestuff (containing 18% NaCl),
- 3.0% dispersing agent based on ligninsulfonate,
- 15.0% NaCl,
- 0.2% $KH_2PO_4$,
- 0.2% $K_2HPO_4$, and
- 58.5% water was prepared and tested in the same manner as Example I.

This formulation had a viscosity of 1325 cps and displayed no loss of dyeing strength in any of the three dyeing tests.

Four variations of this formulation were made up to investigate the effect of electrolyte and dispersant content on hydrolysis of the fiber reactive group. The hydrolysis was measured by loss of dyeing strength by visual estimation in the exhaust dyeing procedure described in Example I.

|  | Loss of Dyeing Strength After 1 Week of Cycling Between 20 and 50° C. (16 hours and 8 Hours) |
| --- | --- |
| 3 wt. % Dispersant | |
| 15 wt. % Added NaCl | 0% |
| 1 wt. % Added NaCl | 13% |
| 15 wt. % Dispersant | |
| 15 wt. % Added NaCl | 6% |

| | Loss of Dyeing Strength After 1 Week of Cycling Between 20 and 50° C. (16 hours and 8 Hours) |
|---|---|
| 1 wt. % Added NaCl | 16% |

EXAMPLE III

A formulation based on the following dyestuff:

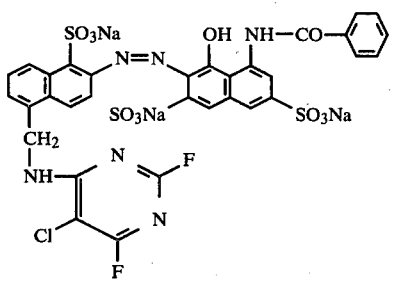
(III)

and having the following composition:
- 17.5% dyestuff (containing 20% NaCl),
- 3.0% dispersing agent based on ligninsulfonate,
- 15.0% NaCl,
- 0.2% $KH_2PO_4$,
- 0.2% $K_2HPO_4$, and
- 64.1% water was prepared and tested in the same manner as Example I.

This formulation had a viscosity of 450 cps and displayed no loss of dyeing in any of the three dyeing tests.

EXAMPLE IV

A formulation based on the following dyestuff:

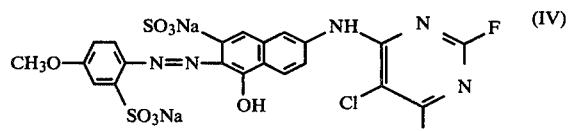
(IV)

and having the following composition:
- 21.8% dyestuff (containing less than 5% NaCl),
- 3.0% dispersing agent based on ligninsulfonate,
- 15.0% NaCl,
- 0.2% $KH_2PO_4$,
- 0.2% $K_2HPO_4$, and
- 59.8% water was prepared and tested in the same manner as Example I.

This formulation had a viscosity of 900 cps and displayed no loss of dyeing in any of the three dyeing tests.

EXAMPLE V

A formulation based on the following dyestuff:

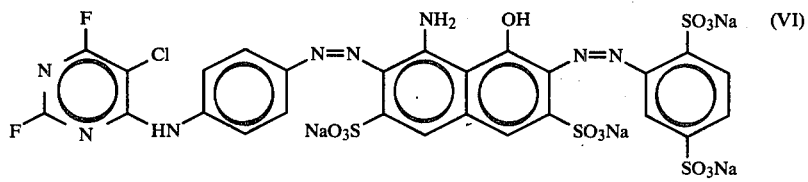
(V)

and having the following composition:
- 26.8% dyestuff (containing 15% NaCl),
- 7.5% condensation product of sulfonated ditolylether with formaldehyde,
- 4.0% NaCl
- 0.5% phosphate buffer (pH 6.5), and
- 65.2% water was prepared as follows:
625 g water, 5 g phosphate buffer, and 75 g of a reaction product of sulfonated ditolylether and formaldehyde, are mixed for 30 minutes in a Dissolver with 268 g of the dyestuff containing 40 g sodium chloride. In place of the Dissolver a pulverizing mill made out of carborundum will give similar results.

EXAMPLE VI

A formulation based on the following dyestuff:

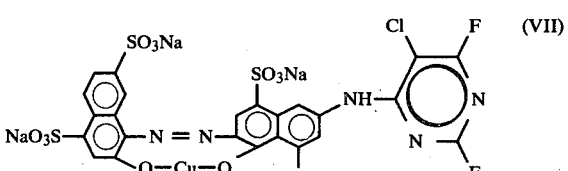
(VI)

and having the following composition:
- 42.5% dyestuff (containing 15% NaCl),
- 7.5% condensation product of sulfonated ditolylether with formaldehyde,
- 5% polyvinylpyrrolidone with a K-value of 17,
- 0.5% phosphate buffer (pH 6.5), and
- 44.5% water was prepared in the same manner as Example V.

EXAMPLE VII

A formulation based on the following dyestuff:

(VII)

and having the following composition:
- 18.0% dyestuff (containing 6% NaCl),
- 8% condensation product of sulfonated ditolylether with formaldehyde,
- 0.5% phosphate buffer (pH 6.5), and
- 66.4% water was prepared in the same manner as Example V.

EXAMPLE VIII

A formulation based on a mixture of the following dyestuffs:

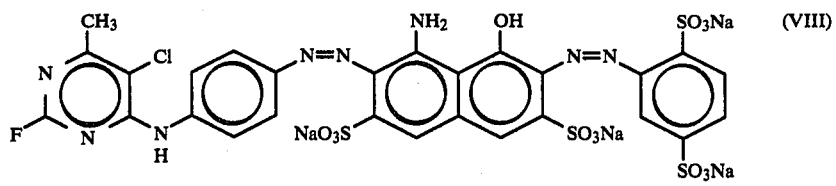

(VIII)

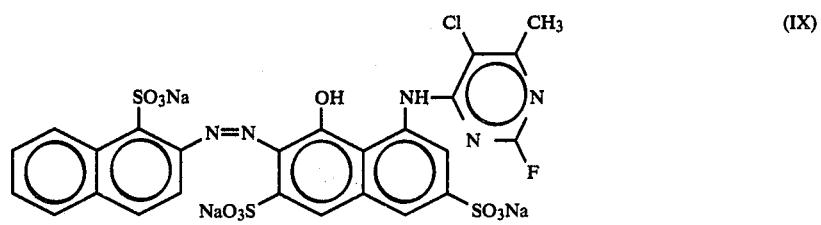

(IX)

and having the following composition:
- 21.3% dyestuff (containing 15% NaCl),
- 4.8% dyestuff (containing 10% NaCl),
- 6.7% condensation product of sulfonated ditolylether with formaldehyde,
- 0.5% phosphate buffer (pH 6.5), and
- 66.7% water was prepared in the same manner as Example V.

EXAMPLE IX

A formulation based on the following dyestuff:

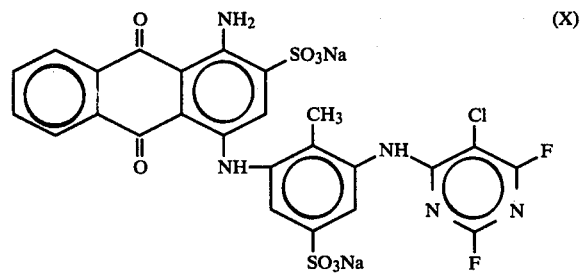

(X)

and having the following composition
- 16.4% dyestuff (containing 20% of a mixture of NaCl and Na2SO4)
- 10% dispersing agent based on ligninsulfonate,
- 0.5% phosphate buffer (pH 6.5),
- 0.3% benzylalcohol as preservative, and
- 62.8% water was prepared in the same manner as Example V.

EXAMPLE X

A formulation based on the following dyestuff:

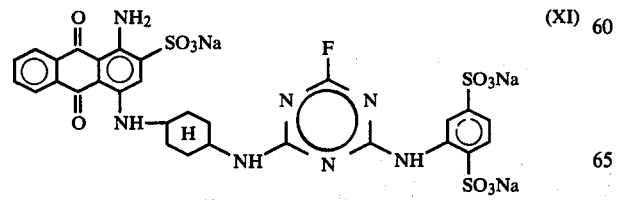

(XI)

and having the following composition:

- 18.75% dyestuff (containing 25% of a mixture of NaCl and Na2SO4),
- 10% dispersing agent based on polyvinylpyrrolidone with a K-value of 30,
- 1% phosphate buffer (pH 7), and
- 70.25% water was prepared in the same manner as Example V.

What is claimed is:

1. A storage stable concentrated fluid aqueous dispersion of at least one water soluble cold dyeing fiber reactive dyestuff having superior kinetic solubility comprising (A) between about 10 and 50 wt. % of at least one dyestuff having an average particle size less than about 100 microns of the formula:

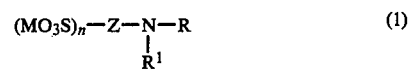

(1)

wherein
M = the cation of Li, Na, K, NH3 or an organic amine
n = an integer of 1 to 5
Z = a dyestuff chromophore system
$R^1$ = H or a $C_1$ to $C_4$ alkyl, and
R = a fiber reactive group of one of the following structures:

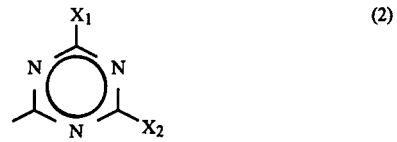

(2)

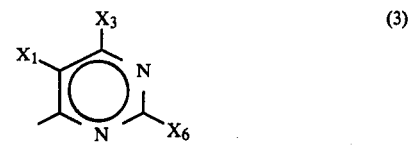

(3)

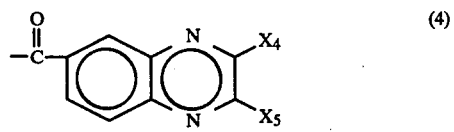

(4)

wherein
$X_1$ = Cl, F, but F if $X_2$ not F or Cl
$X_2$ = Cl, F, $NH_2$, $NHR^2$, $OR^2$, $SR^2$, —$CH_2R^2$ $X_3$=Cl, F, CH$_3$
$X_4$=Cl, F
$X_5$=Cl, F, CH$_3$ $X_6$=Cl, F
with the proviso that one of $X_3$ and $X_6$ is F,
and wherein
$R^2$=alkyl substituted by OH, SO$_3$H, COOH, or C$_1$-C$_4$-alkoxy,
aryl substituted by SO$_3$H, C$_1$-C$_4$-alkyl, or C$_1$-C$_4$-alkoxy,
aralkyl substituted by SO$_3$H, C$_1$-C$_4$-alkyl, or C$_1$-C$_4$-alkoxy;
(B) between about 2 and 15 wt. % of dispersant selected from the group consisting of anionic dispersing agents and vinyl polymers synthesized from monomers of the formula

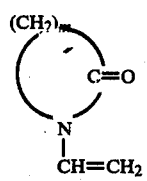

(5)

in which m is an integer from 3 to 5; and
(C) between about 4 and 25 wt. % of water soluble electrolyte said dispersion having a viscosity at 20° C. of less than 5,000 cps at 20 rpm.

2. The dispersion of claim 1 containing
(a) between about 15 and 40 wt. % of at least one dyestuff of formula (1);
(b) between about 2 and 15 wt. % of the dispersant; and
(c) between about 4 and 25 wt. % of the electrolyte.

3. The dispersion of claim 2 containing between about 0.1 and 3 wt. % of a buffering agent which is inert to the fiber reactive groups of the dispersed dyestuffs.

4. The dispersion of claim 3 containing
(a) between about 2 and 5 wt. % of the dispersant, and
(b) between about 0.2 and 1 wt. % of the buffer.

5. The dispersion of claim 1, 2, 3 or 4 wherein the dyestuffs conform to formula (1) with
(a) M=cation of Li, Na or K;
(b) n=an integer of 1 to 4;
(c) Z=a dyestuff chromophore selected from the group consisting of mono- or polyazo, anthraquinone and phthalocyanine;
(d) R'=H or CH$_3$; and
(e) R=a fiber reactive group selected from

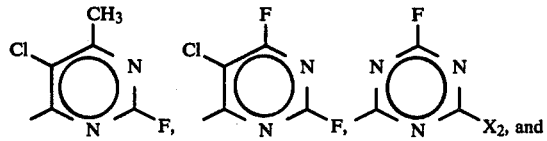

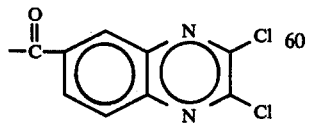

wherein $X_2$ has the meaning given in claim 1 and $X_6$ is a C$_1$ to C$_4$ alkyl.

6. The dispersion of claim 1, 2, 3 or 4 wherein the dispersant is selected from the group consisting of:

(a) condensation products of aromatic sulfonic acid with formaldehyde;
(b) condensation products of ketones with alkali metal bisulphites and formaldehyde; and
(c) alkali metal ligninsulfonate and their derivatives.

7. The dispersion of claim 1, 2, 3 or 4 wherein the dispersant is a polyvinyl pyrrolidone having a K-value between about 15 and 100.

8. The dispersion of claim 3 or 4 wherein the buffer stabilizes the pH at between about 5 and 8.

9. The dispersion of claim 3 or 4 wherein
(a) the dispersant is an alkali metal ligninsulfonate;
(b) the electrolyte is selected from the group consisting of LiCl, Li$_2$SO$_4$, NaCl, Na$_2$SO$_4$, (NH$_4$)$_2$SO$_4$ and mixtures thereof; and
(c) the buffer is a mixture of KH$_2$PO$_4$ and K$_2$HPO$_4$.

10. The dispersion of claim 1, 2, 3 or 4 wherein the average dispersed particle size is between about 1 and 50 microns.

11. The dispersion of claim 10 wherein the average dispersed particle size is between about 1 and 10 microns.

12. An aqueous dispersion of at least one fiber reactive dyestuff comprising:
(a) between about 10 and 50 wt. % of at least one dyestuff of the following constitution:

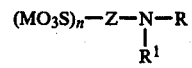

wherein
M=the cation of Li, Na, K, NH$_3$ or an organic amine,
n=an integer of 1 to 5,
Z=dyestuff chromophore system,
$R^1$=H or C$_1$-C$_4$ alkyl, and
R=a fiber reactive group of one of the following structures:

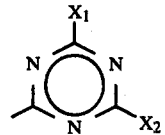

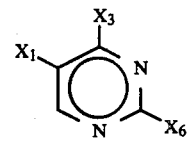

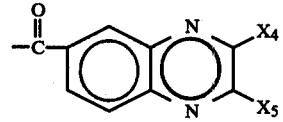

wherein
$X_1$=Cl, F but F if $X_2$ not F or Cl
$X_2$=Cl, NH$_2$, NHR$^2$, OR$^2$, SR$^2$, —CH$_2$R$^2$,
$X_3$=Cl, F, CH$_3$,
$X_4$=Cl, F, and
$X_5$=Cl, F, CH$_3$ $X_6$=Cl, F
with the proviso that at least one of $X_3$ and $X_6$ is F, and wherein
$R^2$=alkyl substituted by OH, SO$_3$H, COOH, C$_1$-C$_4$—alkoxy, or aryl substituted by SO₃H, C₁-C₄-alkyl, C₁-C₄-alkoxy, or aralkyl substituted by SO₃H, C₁-C₄-alkyl, C₁-C₄-alkoxy;

(b) between about 1 and 25 wt. % of at least one anionic dispersing agent or a vinyl polymer synthesized from the following manner:

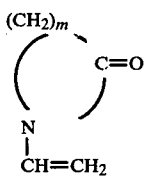
(5)

in which m is an integer of 3 to 5 and having a K-value between 15 and 100;

(c) between about 1 and 30 wt. % of a water-soluble salt electrolyte; and (d) between 0.1 and 3 wt. % of at least one buffering agent which is inert to the fiber reactive group of the dispersed dyestuff said dispersion having a viscosity at 20° C. of less than 5,000 cps at 20 rpm.

13. A concentrated fluid aqueous dispersion of at least one water-soluble cold dyeing fiber reactive dyestuff having superior kinetic solubility and being stable against significant hydrolysis of its fiber reactive groups and against significant settlement or agglomeration upon being cycled between 50° and 20° C. for three weeks comprising:

(a) between about 15 and 40 wt. % of at least one dyestuff of the formula

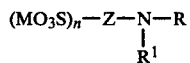

wherein
M = the cation of Li, Na or K,
n = an integer of 1 to 4,

Z = a dyestuff chromophore selected from the group consisting of mono- or polyazo, anthraquinone and phthalocyanine, R¹ = H or a C₁ to C₄ alkyl, and R = a fiber reactive group selected from

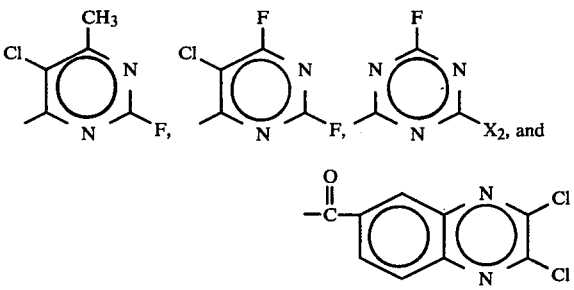

wherein X₂ has the meaning given in claim 1 and X₆ is a C₁ to C₄ alkyl.

(b) between 2 and 5 wt. % of a sodium ligninsulfonate dispersant which has
 (i) a low or no sugar content,
 (ii) a molecular weight between about 5000 and 50,000, and
 (iii) between about 0.5 and 5 sulfonic acid groups per 1000 molecular weight units;

(c) between 4 and 25 wt. % of an alkali metal or ammonium salt of an inorganic acid; and (d) between 0.2 and 1 wt. % of a buffering agent which is inert to the fiber reactive group of the dispersed dyestuff, said buffering agent stabilizing the pH of the dispersion between about 5 and 8, said dispersion having an average particle size of between about 1 and 10 microns and a viscosity at 20° C. of less than 5000 cps.

14. A process of dyeing substrates containing natural or regenerated cellulose fibers or wool fibers comprising adding the dispersion of claim 1, 2, 3, 4, 12 or 13 to an aqueous dye bath and adjusting the temperature and pH so as to cause the fiber reactive groups of the dispersed dyestuff to react with the hydroxyl, amine or amide groups of the substrate.

* * * * *